US009727892B1

(12) United States Patent
Chen et al.

(10) Patent No.: US 9,727,892 B1
(45) Date of Patent: Aug. 8, 2017

(54) DETERMINING RELATED SEARCH TERMS FOR A DOMAIN

(75) Inventors: Kai Chen, Santa Monica, CA (US); William David Reardon, Santa Monica, CA (US); Jinjun Xu, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 965 days.

(21) Appl. No.: 13/284,417

(22) Filed: Oct. 28, 2011

(51) Int. Cl.
*G06Q 30/02* (2012.01)

(52) U.S. Cl.
CPC .............................. *G06Q 30/0256* (2013.01)

(58) Field of Classification Search
USPC ......... 705/14.41, 14.42, 14.46, 14.52, 14.54, 705/14.55
See application file for complete search history.

(56) References Cited

U.S. PATENT DOCUMENTS

| | | | |
|---|---|---|---|
| 7,860,859 B2 | 12/2010 | Haugen et al. | |
| 7,987,194 B1 | 7/2011 | Walker et al. | |
| 2005/0091106 A1* | 4/2005 | Reller et al. | 705/14 |
| 2005/0114324 A1* | 5/2005 | Mayer | 707/3 |
| 2005/0149396 A1* | 7/2005 | Horowitz et al. | 705/14 |
| 2006/0089928 A1* | 4/2006 | Johnson | 707/4 |
| 2006/0149625 A1 | 7/2006 | Koningstein | |
| 2006/0218035 A1* | 9/2006 | Park et al. | 705/14 |
| 2007/0150342 A1* | 6/2007 | Law et al. | 705/14 |
| 2007/0271392 A1* | 11/2007 | Khopkar et al. | 709/245 |
| 2007/0271501 A1* | 11/2007 | Vasilik | 715/511 |
| 2008/0103892 A1 | 5/2008 | Chatwin et al. | |
| 2008/0154684 A1* | 6/2008 | Kniaz et al. | 705/8 |
| 2008/0294630 A1 | 11/2008 | Yan et al. | |
| 2009/0119259 A1 | 5/2009 | Williams et al. | |
| 2009/0299831 A1* | 12/2009 | Li et al. | 705/14.1 |
| 2009/0319517 A1* | 12/2009 | Guha et al. | 707/5 |
| 2009/0319518 A1 | 12/2009 | Koudas et al. | |
| 2010/0042492 A1 | 2/2010 | Stokes | |
| 2010/0076979 A1* | 3/2010 | Wang et al. | 707/740 |

(Continued)

OTHER PUBLICATIONS

Chen et al., Advertising Keyword Suggestion Based on Concept Hierarchy, WSDM .08 Preceedings of the international conference on Web search and web data mining ACM New Yor, NY, US, 2008, p. 251-260, 10 pages.

(Continued)

*Primary Examiner* — Rutao Wu
*Assistant Examiner* — Alfred Tsui
(74) *Attorney, Agent, or Firm* — Foley & Lardner LLP; John D. Lanza

(57) ABSTRACT

A method, system, and program product, for determining related search terms for a domain, comprising: receiving a request for related search terms for a domain, obtaining click data on the domain for initial related search terms determined for the domain, obtaining revenue generation data for each of a plurality of the initial related search terms; determining a first set of the initial related search terms with a highest revenue or ad clicks generation; generating a second set of new related search terms, comprising: obtaining keywords that are semantically relevant, obtaining how many advertisements are targeted to the respective keyword, and obtaining for each of multiple of the respective keywords an amount that advertisers have paid over a period of time for use of the respective keyword.

20 Claims, 4 Drawing Sheets

(56) References Cited

U.S. PATENT DOCUMENTS

| | | |
|---|---|---|
| 2010/0125597 A1 | 5/2010 | Shanbhag |
| 2010/0169249 A1* | 7/2010 | Jhala et al. ..................... 706/12 |
| 2010/0174708 A1* | 7/2010 | Ball et al. ..................... 707/727 |
| 2010/0306226 A1 | 12/2010 | Mawani et al. |
| 2010/0306229 A1 | 12/2010 | Timm et al. |
| 2011/0055192 A1* | 3/2011 | Tang et al. ................... 707/706 |
| 2011/0145058 A1* | 6/2011 | Liu et al. ................... 705/14.45 |
| 2011/0313843 A1* | 12/2011 | Rounthwaite et al. .... 705/14.42 |

OTHER PUBLICATIONS

Office Action on U.S. Appl. No. 13/449,668 dated Apr. 10, 2013.
Office Action on U.S. Appl. No. 13/449,668 dated Aug. 13, 2013.

\* cited by examiner

Fig. 4

- CarAndHealthInsuranceQuotesOnline.com

- What you need, when you need it
- October 28, 2011
- Bookmark this page Make this your homepage

- Related Searches
- Insurance quotes
- Car insurance
- Pet health insurance
- Life insurance
- Health insurance
- Auto insurance
- Auto warranty
- Used cars
- Automobile insurance

DETERMINING RELATED SEARCH TERMS FOR A DOMAIN

BACKGROUND OF THE INVENTION

A problem arises in determining search terms for domains. Embodiments herein are directed to this problem.

SUMMARY

Embodiments of a method are disclosed for an advertisement server that comprises one or more computers. The method is for determining related search terms for a domain, and comprises in embodiments, receiving, by the one or more computers, a request for related search terms for a domain; determining or having determined, using the one or more computers, initial related search terms for the domain based on one or more first parameters; and obtaining click data on the domain, using the one or more computers, for the initial related search terms determined for the domain. Embodiments of the method may further comprise obtaining revenue generation data for each of a plurality of the initial related search terms, using the one or more computers, wherein revenue generation data comprises data indicating that a user has clicked on a given one of the initial related search terms present on the domain and further clicked on an advertisement displayed in response to clicking the initial related search term, and determining, using the one or more computers, a first set that is greater than one of the initial related search terms with a highest revenue or ad clicks generation as compared to other of the initial related search terms, based at least in part on the revenue or ad clicks generation data. Embodiments of the method may further comprise generating a second set that is greater than one of new related search terms, using the one or more computers, comprising: obtaining keywords, using the one or more computers, that are semantically relevant to the first set of initial related search terms based at least in part on one or more match scores, and obtaining for each of multiple of the keywords, using the one or more computers, how many advertisements are targeted to the respective keyword, and obtaining for each of multiple of the respective keywords, using the one or more computers, an amount that advertisers have paid over a period of time for use of the respective keyword by the advertisement server to bring up their respective advertisement when a direct search is made using the respective keyword. Embodiments of the method may further comprise selecting respective keywords for the second set of new related search terms based at least in part on how many advertisements are targeted to the respective keyword and based at least in part on how much advertisers have paid over a period of time for use of the respective keyword, and listing, using the one or more computers, on a landing page returned for the domain, the first set of initial related search terms with a highest revenue generation and the second set of new related search terms.

Embodiments of an advertisement server are also disclosed for determining related search terms for a domain, with the advertisement server comprising one or more computers configured to perform the following steps: receiving, by the one or more computers, a request for related search terms for a domain; determining or having determined, using the one or more computers, initial related search terms for the domain based on one or more first parameters; and obtaining click data on the domain, using the one or more computers, for the initial related search terms determined for the domain. Embodiments of the advertisement server may also be configured for obtaining revenue generation data for each of a plurality of the initial related search terms, using the one or more computers, wherein revenue generation data comprises data indicating that a user has clicked on a given one of the initial related search terms present on the domain and further clicked on an advertisement displayed in response to clicking the initial related search term; determining, using the one or more computers, a first set that is greater than one of the initial related search terms with a highest revenue or ad clicks generation as compared to other of the initial related search terms, based at least in part on the revenue or ad clicks generation data; and generating a second set that is greater than one of new related search terms, using the one or more computers. The generating a second set of new related search terms may comprise, in embodiments, obtaining keywords, using the one or more computers, that are semantically relevant to the first set of initial related search terms based at least in part on one or more match scores; obtaining for each of multiple of the keywords, using the one or more computers, how many advertisements are targeted to the respective keyword; obtaining for each of multiple of the respective keywords, using the one or more computers, an amount that advertisers have paid over a period of time for use of the respective keyword by the advertisement server to bring up their respective advertisement when a direct search is made using the respective keyword; and selecting respective keywords for the second set of new related search terms based at least in part on how many advertisements are targeted to the respective keyword and based at least in part on how much advertisers have paid over a period of time for use of the respective keyword. The advertisement server then lists, using the one or more computers, on a landing page returned for the domain, the first set of initial related search terms with a highest revenue generation and the second set of new related search terms.

BRIEF DESCRIPTION OF THE DRAWINGS

The above and related objects, features and advantages of the present disclosure will be more fully understood by reference to the following detailed description, when taken in conjunction with the following figures, wherein:

FIG. 4 is a mock screen shot of a domain landing page.

DETAILED DESCRIPTION OF EMBODIMENTS

Embodiments described generally relate to a system, method and program product for determining best performing terms for related search teens in a given domain. There are many domains such as http://carandhealthinsurancequotesonline.com/, http://insurancesspecficindustry.com/, http://songbird.net, http://picnic.com/, to name a few. It is desirable to determine the most effective related search terms for a given domain, on an ongoing basis for use in providing domain landing pages and for other purposes. An example landing page for a domain is illustrated in FIG. 4.

Figure 1:
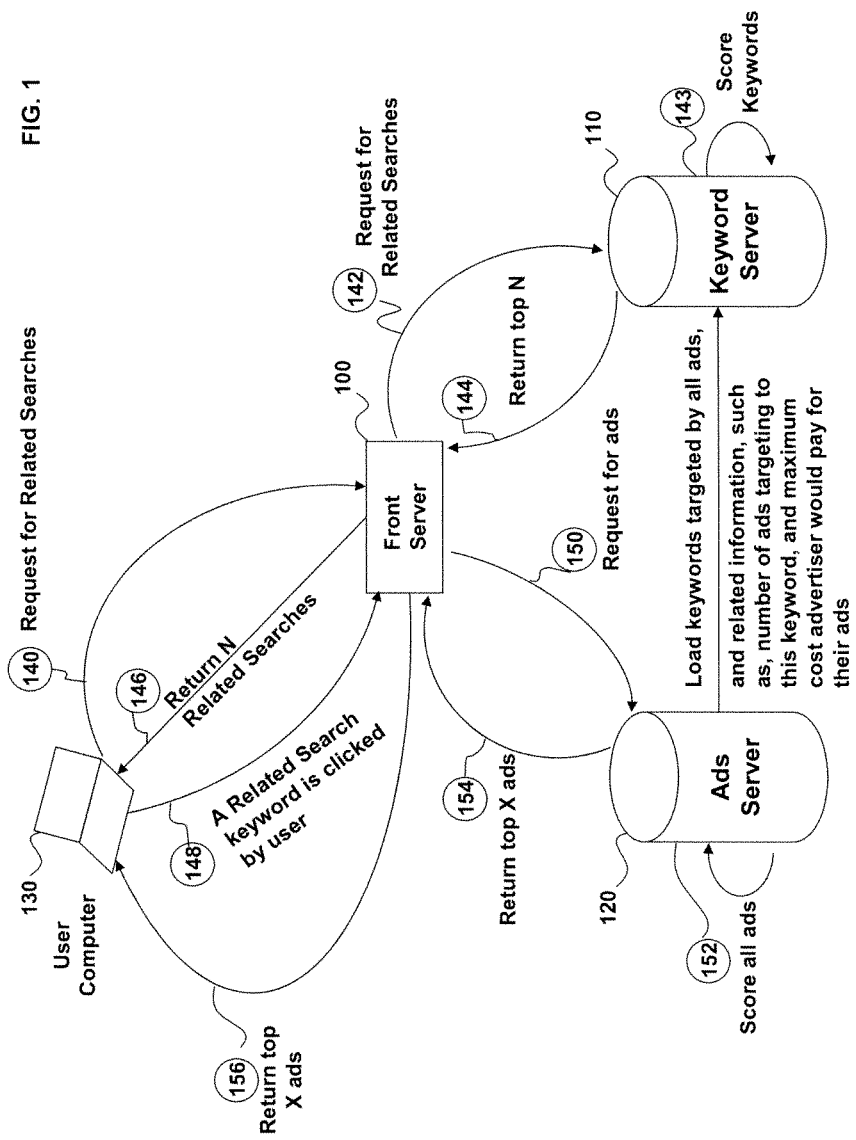
FIG. 1 is a schematic block diagram of a system for determining related search terms for a domain.

FIG. 1 comprises an example server embodiment for implementing embodiments disclosed herein. Note that the disclosure is not limited to any particular configuration of servers, and FIG. 1 is provided for illustrative purposes only.

A front server 100 is shown, coupled by one or more electronic networks to a keyword server 110, an advertisement (Ads) server 120, and to one or more user computers 130. Each of the servers may be implemented by one or more computers.

The front server 100 may be configured with programming to provide one or more application programming interfaces (API's), accessible by the user computer 130. In embodiments herein at least one of the API's is configured to receive requests 140 from user computers 130 of domain owners and/or advertisers for related search terms for a domain. In embodiments, the front server 100 may generate and send a request 142 via the electronic network to the keyword server 110 for related search terms for the domain. The keyword server 110 generates 143 N keywords based at least in part on one or more algorithms (examples of which will be described below), and provides via line 144 the N keywords to the front server 100.

In embodiments, the front server 100 returns 146 the N keywords as related search terms to the user computer 130. In embodiments, the front server may receive 148 selections for one or more of the N related search terms from the user computer 130.

In embodiments, the front server 100 may send a request 150 for advertisements (ads) to the Ads server 120.

In embodiments, the keywords that are to be targeted by ads, and related information, such as a number of ads targeting to a given keyword, a maximum cost an advertiser is or may be willing to pay for ad impressions or ad clicks, to name a few, are loaded into storage for one or more of the servers.

The Ads server 120 provides ads (represented by line 152) from the different advertisers and returns, as represented by line 154, X ads to the front server 100. The basis on which the Ads server 120 selects ads to be returned is not limiting on the embodiments. The Ads server may select ads targeted to particular keywords, and/or may select ads based on a predicted click through rate, to name a few of the algorithms that may be used by the Ads server 120 in its selection.

The X top scoring ads are returned, as represented by line 156, to the user computer 130. Note that in embodiments, the X top scoring ads may be filtered by the front server 100 and fewer ads returned to the user computer 130. Alternatively or in addition, more ads may be added by the front server 100 and returned to the user computer 100 with the X top scoring ads.

Figure 2:
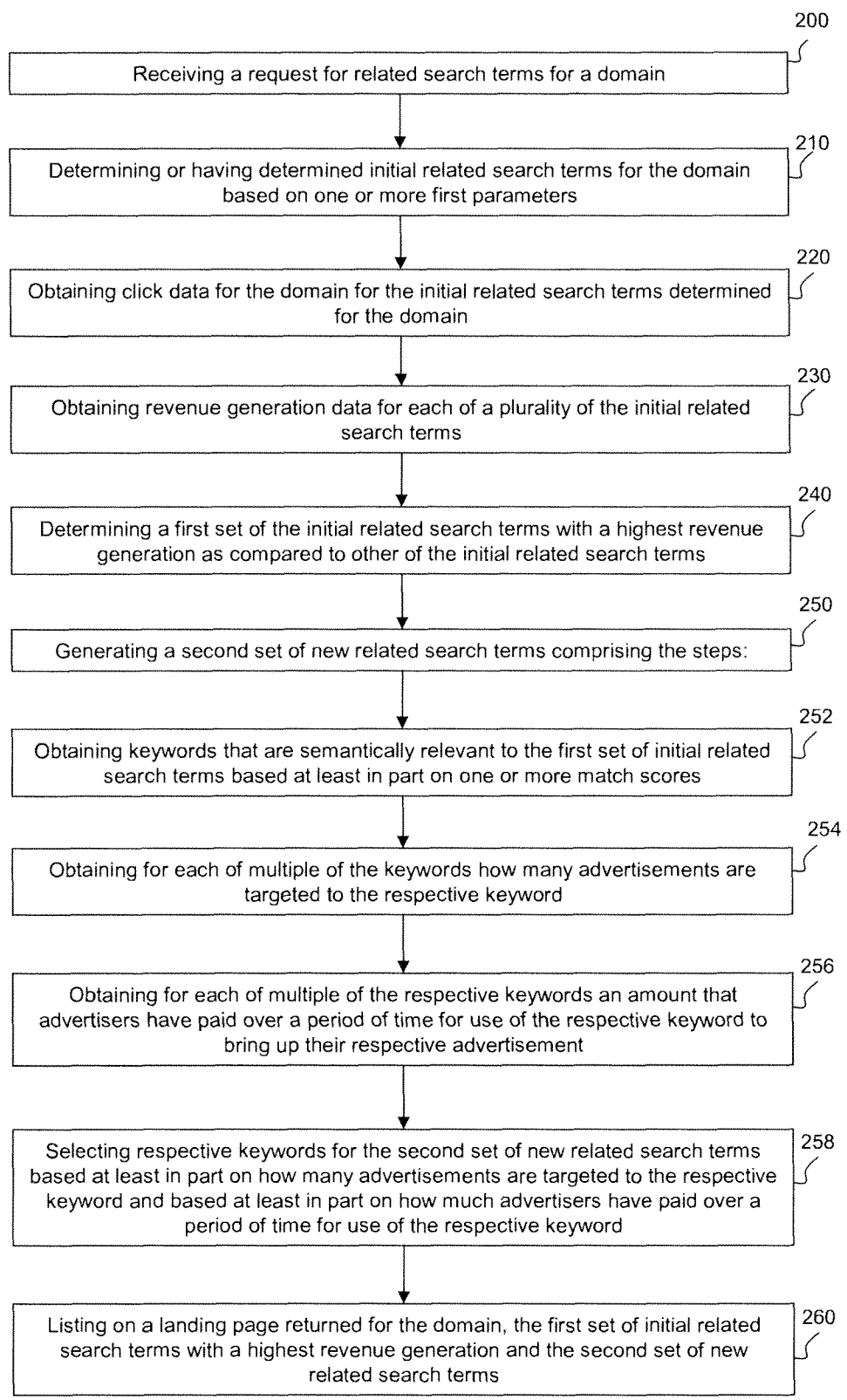
FIG. 2 is a schematic flow chart of a process for determining related search terms for a domain.

Embodiments of a process for determining best performing related search terms is provided in FIG. 2. Block 200 in FIG. 1 comprises an operation of receiving, by the front server 100, via one or more computers, the request 140 for related search terms for a domain. In embodiments, the request may be received electronically over a network, or by telephone, or by Fax, or in the mail, and then keyed or scanned into the one or more computers of the server 100.

Block 210 comprises an operation of determining or having determined, using the one or more computers, initial related search terms for the domain based on one or more first parameters. In embodiments, this operation may comprise the operations 142, 143, and 144 of FIG. 1. In embodiments, scoring may comprise determining a term match score for the respective term based on a number of matches to a set of related terms, and/or determining a vertical match score comprising for the respective term a number of matches to a vertical for the respective related term. An example of a scoring algorithm to obtain the initial related search terms is discussed below.

Block 220 comprises an operation of obtaining click data on the domain using the one or more computers, for the initial related search terms determined for the domain. In embodiments, this click data may be obtained from the user computers 130 or another computer which is hosting or otherwise authorizing the domain. Click data may comprise in embodiments data indicating a click from a customer computer on a related search term and any subsequent clicks may from the customer computer that create advertisement impressions.

Block 230 comprises an operation of obtaining revenue generation data for each of a plurality of the initial related search terms, using the one or more computers. In embodiments, the revenue generation data may comprise data indicating that a user has clicked on a given one of the initial related search terms presented on the landing page for the domain and further clicked on an advertisement displayed in response to clicking the initial related search term. In embodiments, this revenue generation data may be obtained from the user computer 130 or from another computer which is hosting or otherwise authorizing the domain. In embodiments, one or more of the servers may monitor a process log for the domain of interest and count which terms received clicks, and whether that click led to a click on a particular advertisement—which generates revenue.

Block 240 comprises an operation of determining, using the one or more computers, a first set that is greater than one of the initial related search terms with a highest revenue or ad clicks generation as compared to other of the initial related search terms, based at least in part on the revenue generation data of block 230. In embodiments, this may be for a given period of time.

Block 250 comprises an operation of generating a second set that is greater than one of new related search terms, using the one or more computers. In embodiments, the operation may comprise one or more of the operations described in blocks 252-258, as described in embodiments below.

Block 252 comprises an operation of obtaining keywords, using the one or more computers, that are semantically relevant to the first set of initial related search terms based at least in part on one or more match scores. An example of semantic relevancy algorithm will be described below.

Block 254 comprises an operation of obtaining for each of multiple of the keywords, using the one or more computers, how many advertisements are associated with the respective keyword. In embodiments, this information may be obtained by accessing one of the servers and/or one or more databases containing that information, e.g., an ads Server.

Block 256 comprises and operation of obtaining for each of multiple of the respective keywords, using the one or more computers, an amount that advertisers have paid over a period of time, e.g., multiple hours, one or more days, one or more weeks, one or more months, etc., for use of the respective keyword by the server to bring up their respective advertisement when a direct search is made using the respective keyword. This monitoring could be ongoing. By way of example, this amount may be obtained in embodiments from an ads server.

Block 258 comprises an operation of selecting respective keywords for the second set of new related search terms based at least in part on how many advertisements are targeted to the respective keyword and based at least in part on how much advertisers have paid over a period of time for use of the respective keyword. In embodiments, these numbers may be measured relative to threshold number(s) and/or relative to the results for other keywords.

Block 260 comprises an operation of listing, using the one or more computers, on a landing page returned for the domain, the first set of initial related search terms with a highest revenue generation and the second set of new related search terms.

In embodiments, the operation 252 of obtaining keywords that are semantically relevant to the first set of related search terms comprises, for a respective keyword, determining a term match score for the respective keyword based on a number of matches to the first set of related terms, and a vertical match score comprising for the respective keyword a number of matches to a vertical for the respective related term. Note that a vertical is a click down hierarchy.

In embodiments, the operation 256 of obtaining for each of multiple of the first set of initial related search terms an amount that advertisers have paid over a period of time for use of the respective search term comprises calculating a total of payments to the advertisement server for use of the respective initial related search term.

In embodiments, the operation 210 of determining initial related search terms comprises determining a group of one or more related search terms based at least in part on a segmentation of the name of the domain and/or using a spell check algorithm to determine if the name of the domain or a segment thereof is a correct spelling of a word, and if not determining a popular search term that is closest to this name of the domain or a segment thereof. Thus, in embodiments, this algorithm may comprise: searching the term in a dictionary to check if this term is a correctly spelled term in the dictionary, and if the term does not match any word in the dictionary, searching electronically for a popular search term from one or more databases, such as a search engine database, to determine a term that is closest to this misspelled term. For example, for the domain carinsuranc.org, a segmentation operation results in "car"+"insuranc." The term "insuranc" is not defined in the electronic dictionary, but is very close to the word "insurance" found in the dictionary and/or found in one or more search term databases. The two word search term "car insurance" is a very popular search term, as determined from searching the search term databases. Thus, in this example the spell check algorithm will generate the terms "car" and "insurance."

Accordingly, in embodiments, the operation 210 of determining initial related search terms comprises determining a group of one or more related search terms based at least in part on a segmentation of the name of the domain and/or using the spell check algorithm to determine if the name of the domain or a segment thereof is a correct spelling of a word, and if not determining a popular search term that is closest to this name of the domain or a segment thereof.

In embodiments, the operation 210 of determining initial related search terms may comprise the operation of obtaining initial keywords that are semantically relevant to one or more of the group of initial related search terms based at least in part on one or more match scores. In embodiments, the operation 210 of determining initial related search terms comprises obtaining for each of multiple of the initial keywords, using the one or more computers, how many advertisements are targeted to the respective initial keyword. In embodiments, the operation 210 of determining initial related search terms comprises the operation of obtaining for each of multiple of the respective keywords, using the one or more computers, how much advertisers have paid over a period of time for use of the respective initial keyword to bring up their respective advertisement when a direct search is made using the respective initial keyword. Note that this data may be obtained in embodiments from an ads server. In embodiments, the operation 210 of determining initial related search terms may comprise an operation of selecting respective initial keywords for the initial related search terms based at least in part on how many advertisements are targeted to the respective initial keyword and based at least in part on how much advertisers have paid over a period of time for use of the respective initial keyword.

In embodiments, the first set of the initial related search terms is a number selected from the group of 3, 4, and 5.

In embodiments, the method may further comprise an operation of including additional terms in the second set of new related search terms based on input from an advertiser.

In embodiments, the method may further comprise an operation of including additional terms in the second set of new related search terms based on commercial searches on a search engine using terms that are related to the initial related search terms.

In embodiments, the method may further comprise performing substantially periodically or continuously the method steps with the initial related search terms for a given iteration comprising the first set of initial related search terms with a highest revenue or ad clicks generation and the second set of new related search terms from an immediately preceding iteration of the method.

In embodiments, the one or more match scores of the operation 252 comprise one or more selected from the group of a term match score and a vertical match score.

As an example, for the domain carsinsurancequotesonline.com comprises:

Step 1. Use the domain name carandhealthinsurancequotesonline.com to perform an initial selection of related search keywords. This operation can be accomplished by performing a domain name segmentation and a spell check algorithm. In this case, the terms "cars"/"insurance"/"quotes"/"online" are obtained from the segmentation of domain name.

Step 2. Perform term expansions of these terms: expand from "cars"/"insurance"/"quotes"/"online" to more related terms from a database and/or server and/or a search engine. In this case, a list of terms, like, insurance, auto, car, quotes, company, quote, rates, car, cheap, mercury, agency, claims, agent, etc., are obtained. In embodiments, one such expansion may be based on how often these terms are shown on the same web page in the Internet, e.g., for example by searching web pages on the Internet that can be crawled. For example, "insurance" is always shown on the same web page as "claims," and "agent." Thus, "claims," and "agent" may be determined to be related to the "insurance."

Step 3. This pool of keywords may be scored. The Ads server may contain or reference a pool of keywords that are targeted by advertisers. For example, "cheap car insurance" is targeted by some advertisers, such as insurance advertisers. This pool of keywords may be scored according to
 1) How this keyword is semantically relevant to the list of keywords generated from step 2. For example, semantic relevance may be scored according to term match and vertical match.
 2) How many ads are targeting to this keyword.
 3) How much advertisers are willing to pay for their ads using these keywords. Then, the top 10 (or top 20) keywords may be selected as related searches and provided to the user computers.

Step 4, process the domain log and obtain the top 5 (or top 3) related search keywords that generated the most revenue or most ad clicks. For example, "car insurance," "car insurance over 50," "cheap car insurance in UK," "taxi insurance quote online" and "house insurance quotes" may be the top performing keywords.

Step 5, these 5 best performing keyword may be used as related search terms. In embodiments, this process may be used for selecting the best performing related search terms, e.g., Term Expansion (Step 2) and Keywords Targeting, (Step 3).

As noted, additional terms may be added based on some other mechanism, such as partner suggested terms, advertiser suggested terms, related commercial searches, to obtain more related search terms. In an embodiment, these terms from other sources, e.g., ad partners, etc., may be inserted and weighted based on their effectiveness.

As an example of term matching, for example for a list of terms obtained after a domain name expansion may be "refinance" "loan" "home" "credit" "mortgage" "car" "agent."

The Term Match score for the three-word keyword "home equity loan" matches 2 out of 3 of these terms. The three-word keyword "mortgage refinance agent" matches 3 out of 3 words. Thus, "home equity loan" has lower term match score than "mortgage refinance agent."

An example of vertical match scoring might be:

The words "refinance" "loan" "home" "credit" "mortgage" "car" and "agent" cover the following verticals with weights:

/Finance/Credit & Lending/Loans/Home Loans & Mortgages, Weight 0.5
/Finance/Credit & Lending/Home Financing, Weight 0.3
/Real Estate, Weight 0.2
/Autos & Vehicles, Weigh 0.1
/Autos & Vehicles/Vehicle Shopping, Weight 0.05

Thus:

The three-word term "home equity loan" belongs to/Finance/Credit & Lending/Home Financing and/Finance/Credit & Lending/Home Financing. Score: 0.5+0.3=0.8

The three-word term "mortgage refinance agent" belongs to/Finance/Credit & Lending/Home Financing and/Finance/Credit & Lending/Home Financing. Score: 0.5+0.3=0.8.

The three-word term "house for sale" belongs to/Real Estate and/Finance/Credit & Lending/Home Financing. Score: 0.2+0.3=0.5

Figure 3:
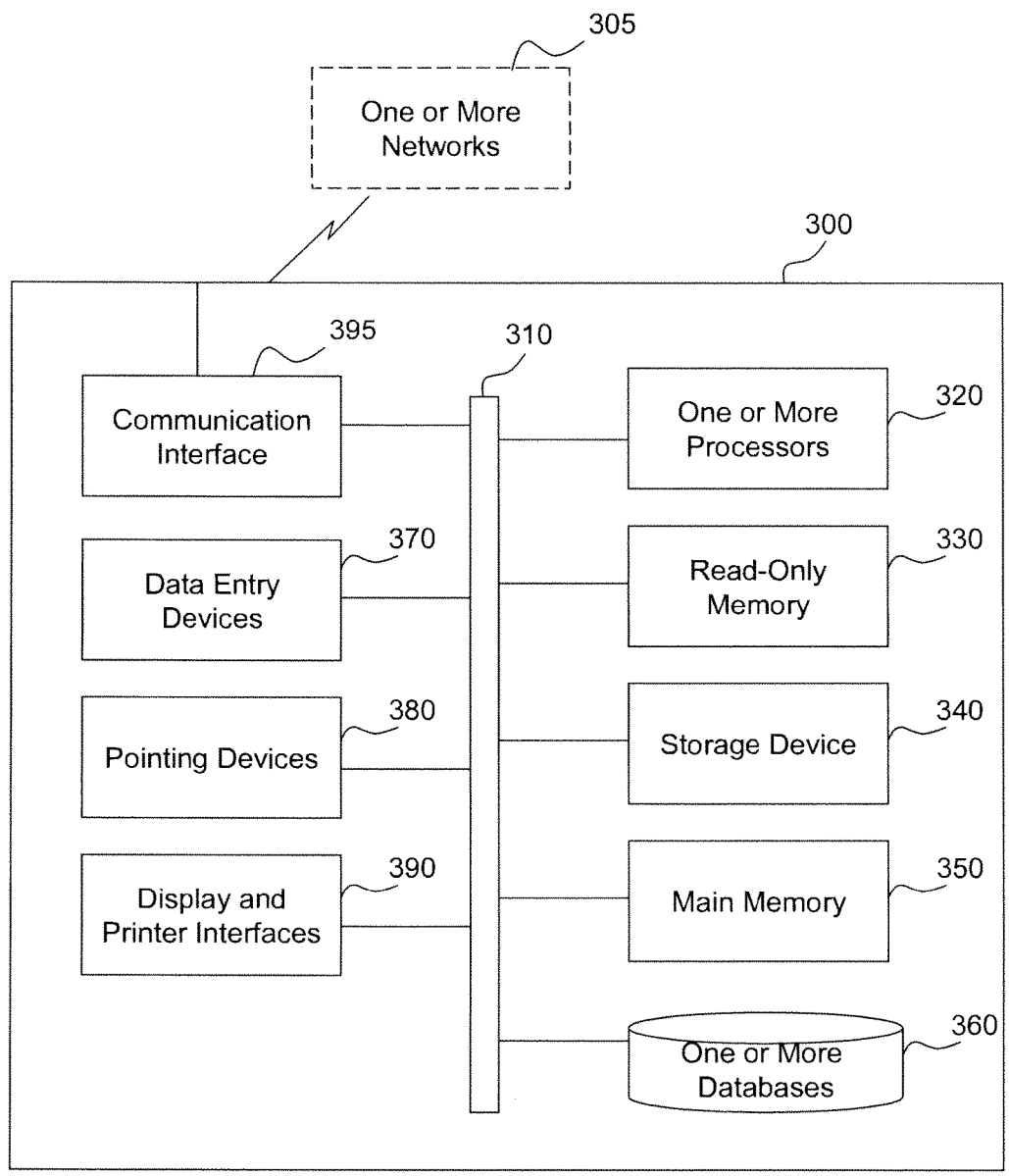
FIG. 3 is a schematic diagram of a computer that may be used to implement one or more of the servers.

FIG. 3 is a block diagram showing an embodiment of a computer system that may be used for implementations, generally designated by reference number 300 in FIG. 3. In one embodiment, the system 300 may be communicatively coupled to one or more networks 305 via a communication interface 395. The one or more networks 305 may represent a generic network, which may correspond to a local area network (LAN), a wireless LAN, an Ethernet LAN, a token ring LAN, a wide area network (WAN), the Internet, a proprietary network, an intranet, a telephone network, a wireless network, to name a few, and any combination thereof. Depending on the nature of the network employed for a particular application, the communication interface 395 may be implemented accordingly. The network 305 serves the purpose of delivering information between connected parties.

In one embodiment, the Internet may comprise the network 305. The system 300 may also or alternatively be communicatively coupled to a network 305 comprising a closed network (e.g., an intranet). The system 300 may be configured to communicate, via the one or more networks 305, with respective computer systems of the one or more entities.

The system 300 may comprise, in some embodiments, a computing platform for performing, controlling, and/or initiating computer-implemented operations, for example, via a server and the one or more networks 305. The computer platform may comprise system computers and other party computers. The system 300 may operate under the control of computer-executable instructions to carry out the process steps described herein. Computer-executable instructions comprise, for example, instructions and data which cause a general or special purpose computer system or processing device to perform a certain function or group of functions. Computer software for the system 300 may comprise, in embodiments, a set of software objects and/or program elements comprising computer-executable instructions collectively having the ability to execute a thread or logical chain of process steps in a single processor, or independently in a plurality of processors that may be distributed, while permitting a flow of data inputs/outputs between components and systems.

The system 300 may be include, one or more personal computers, workstations, notebook computers, servers, mobile computing devices, handheld devices, multi-processor systems, networked personal computers, minicomputers, mainframe computers, personal data assistants, Internet appliances (e.g., a computer with minimal memory, disk storage and processing power designed to connect to a network, especially the Internet, etc.), or controllers, to name a few.

The system 300 may comprise, in embodiments, a bus 310 or other communication component that couples the various system elements 320-395, and is configured to communicate information between the various system elements 320-395.

As shown in FIG. 3, one or more computer processors 320 may be coupled with the bus 310 and configured to process and handle information and execute instructions. The system 300 may include a main memory 350, such as a Random Access Memory (RAM) or other dynamic storage device, coupled to the bus 300, for storing information and instructions to be executed by the one or more processors 320. The main memory 350 also may be used for storing temporary variables or other intermediate information during execution of instructions by the one or more processors 320.

The system 300 further may include a Read-Only Memory (ROM) 330 or other static storage device (e.g., EPROM, EAROM, EEPROM, PROM, flash, and the like) coupled to the bus 310 for storing static information and instructions for the one or more processors 320. Furthermore, a storage device 340, such as a magnetic disk or optical disk, such as a CD-ROM or other optical media may be provided and coupled to the bus 310 for storing information and instructions.

In addition to the ROM 330, one or more databases 360 may be coupled to the bus 310 for storing static information and software instructions. Information stored in or maintained in the database 360 may be provided in conformance with a database system format such as, but not limited to, the Structured Query Language (SQL) format. Database query and access instructions, for example, in the form of one or more scripts, may be used which, when executed by a processor such as the processor 320, serve to access, store and retrieve data maintained in the database 360 according to the instructions contained in the script.

Furthermore, the system 300 may comprise application software instructions which may implement a user interface portion for generating interactive pages or display screens by which a user may provide data to and receive information from the system 300 and the database 360 using a human-machine interface. Interactive pages may include user dialog boxes for accepting user entered information. In particular, the human-machine interface may comprise a Graphical User Interface (GUI) portion for prompting the user to enter data by providing an interactive dialog box or message box instructing the user to enter particular data, or to select from among a multitude of options provided using a pull-down menu. A user may interact with the system 300 via the graphical user interface by using a pointing device and/or data entry device. The GUI portion may place the output of the system 300 in a format for presentation to a user via the display. In at least one embodiment, the GUI may be implemented as a sequence of Java instructions.

A data entry device 370, including alphanumeric and other keys, or a pointing device such as a mouse or trackball, or a scanner, to name a few, may be coupled to the bus 310 for communicating information and command selections to the processor 320. The data entry device 370 may be coupled to the bus 310 via an interface (not shown), wherein the interface may be, for example, a serial port, an RS-232 port, or the like. In addition, the interface may be a wireless interface and provide connection-less communication via, for example, Bluetooth communication.

The system 300 may be coupled via the bus 310 to a display or printer 390 for outputting information to a computer user. In addition, a user may use the display (e.g., touch screen) or printer (e.g., scanner) to provide information to the system 300.

According to at least one embodiment, the various program operations as described herein may be provided by the system 300 in response to the one or more processors 320 executing one or more sequences of computer-readable instructions contained in the main memory 350. Such instructions may be read into the main memory 350 from another computer-readable medium, such as the ROM 330, the storage device 340, or the database 360. Execution of the sequences of instructions contained in the main memory 350 may cause the one or more processors 320 to perform the process steps described herein. It should be appreciated that an embodiment of the system 300 may perform fewer or additional processes as compared to those described herein. As noted, the one or more processors 320 may be arranged in a multi-processing arrangement. Alternatively, hard-wired circuitry may be used in place of or in combination with software instructions to implement the invention. Thus, embodiments of the invention are not limited to any specific combination of hardware circuitry and software.

Embodiments include program products comprising machine-readable media with machine-executable instructions or data structures stored thereon. Such machine-readable media can be any available storage media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other storage medium which can be used to store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention have been described in the general context of method steps which may be implemented in embodiments by a program product including machine-executable instructions, such as program code, for example in the form of program modules executed by machines in networked environments. Generally, program modules include routines, programs, objects, components, data structures, etc., that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced with one or multiple computers in a networked environment using logical connections to one or more remote computers (including mobile devices) having processors. Logical connections may include a local area network (LAN) and a wide area network (WAN) that are presented here by way of example and not limitation. Such networked environments are commonplace in office-wide or enterprise-wide computer networks, and include intranets and the Internet, and may use a wide variety of different communication protocols. Those skilled in the art will appreciate that such network computing environments will typically encompass many types of computer system configurations, including personal computers, hand-held devices such as mobile phones and other PDA appliances, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired and wireless links) through a communications network. In a distributed computing environment, program modules may be located in both local and remote memory storage devices.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations. It should also be noted that the phrase "a plurality" is intended to mean more than one, and is not intended to refer to any previous recitation of the word "plurality," unless preceded by the word "the."

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for determining related search terms for a landing page on a domain, using one or more computers, the method comprising:
   receiving, by the one or more computers, a request for related search terms for a domain;
   determining, using the one or more computers, an initial pool of related search terms for the domain;
   obtaining click data on the domain, using the one or more computers, for the initial pool of related search terms determined for the domain;
   obtaining revenue generation data for each of a plurality of the initial pool of related search terms, using the one or more computers, wherein revenue generation data comprises data indicating that a user has clicked on a given one of the initial related search terms present on the domain and further clicked on an advertisement displayed in response to clicking the initial related search term;
   determining, using the one or more computers, a first set of search terms from the initial pool of related search terms, the first set comprising search terms with higher revenue or click generation as compared to other search terms of the initial pool of related search terms, based at least in part on the obtained revenue generation data or obtained click data;
   generating a second set of at least two new related search terms, using the one or more computers, comprising:
      obtaining keywords, using the one or more computers, that are semantically relevant to the first set of search terms based at least in part on one or more match scores;
      obtaining for each of multiple of the keywords, using the one or more computers, how many advertisements are targeted to the respective keyword;
      obtaining for each of multiple of the respective keywords, using the one or more computers, an amount that advertisers have paid over a period of time for use of the respective keyword by the advertisement server to bring up their respective advertisement when a direct search is made using the respective keyword;
      selecting respective keywords for the second set of new related search terms based at least in part on how many advertisements are targeted to the respective keyword and based at least in part on how much advertisers have paid over a period of time for use of the respective keyword; and
   listing, using the one or more computers, on an updated landing page returned for the domain, the first set of initial related search terms with higher revenue generation and the second set of new related search terms.

2. The method as defined in claim 1, wherein the step of obtaining keywords that are semantically relevant to the first set of related search terms comprises, for a respective keyword, determining a term match score for the respective keyword based on a number of matches to the first set of related terms, and a vertical match score comprising for the respective keyword a number of matches to a vertical for the respective related term.

3. The method as defined in claim 1, wherein the step of obtaining for each of multiple of the respective keywords an amount that advertisers have paid over the period of time for use of the respective keyword comprises calculating a total of payments to the advertisement server for use of the respective initial related search term.

4. The method as defined in claim 1, wherein the determining initial related search terms step comprises determining a group of one or more related search terms based at least in part on using a spell check algorithm to determine if the name of the domain or a segment thereof is a correct spelling of a word, and if not, determining a popular search term that is closest to this name of the domain or a segment thereof.

5. The method as defined in claim 4, wherein the determining initial related search terms step comprises
   obtaining initial keywords that are semantically relevant to one or more of the group of initial related search terms based at least in part on one or more match scores;
   obtaining for each of multiple of the initial keywords, using the one or more computers, how many advertisements are targeted to the respective initial keyword;
   obtaining for each of multiple of the respective keywords, using the one or more computers, how much advertisers have paid over a period of time for use of the respective initial keyword to bring up their respective advertisement when a direct search is made using the respective initial keyword;
   selecting respective initial keywords for the initial related search terms based at least in part on how many advertisements are targeted to the respective initial keyword and based at least in part on how much advertisers have paid over a period of time for use of the respective initial keyword.

6. The method as defined in claim 1, wherein the first set of the initial related search terms is a number selected from the group of 3, 4, and 5.

7. The method as defined in claim 1, further comprising including additional terms in the second set of new related search terms based on input from an advertiser.

8. The method as defined in claim 1, further comprising including additional terms in the second set of new related search terms based on commercial searches on a search engine using terms that are related to the initial related search terms.

9. The method as defined in claim 1, comprising performing substantially periodically or continuously the method steps of claim 1, with the initial related search terms comprising the first set of initial related search terms with higher revenue generation and the second set of new related search terms from an immediately preceding iteration of the method.

10. The method as defined in claim 1, wherein the one or more match scores comprise one or more selected from the group of a term match score and a vertical match score.

11. An advertisement system for determining related search terms for a landing page on a domain, comprising:
   one or more computers configured to perform the following steps:
      receiving, by the one or more computers, a request for related search terms for a domain;
      determining, using the one or more computers, an initial pool of related search terms for the domain;
      obtaining click data on the domain, using the one or more computers, for the initial pool of related search terms determined for the domain;
      obtaining revenue generation data for each of a plurality of the initial pool of related search terms, using the one or more computers, wherein revenue generation data comprises data indicating that a user has clicked on a given one of the initial related search terms present on the domain and further clicked on an advertisement displayed in response to clicking the initial related search term;

determining, using the one or more computers, a first set of search terms from the initial pool for related search terms, the first set comprising search terms with higher revenue or click generation as compared to other search terms of the initial pool of related search terms, based at least in part on the obtained revenue generation data or obtained ad click data;

generating a second set of at least two new related search terms, using the one or more computers, comprising:

obtaining keywords, using the one or more computers, that are semantically relevant to the first set of search terms based at least in part on one or more match scores;

obtaining for each of multiple of the keywords, using the one or more computers, how many advertisements are targeted to the respective keyword;

obtaining for each of multiple of the respective keywords, using the one or more computers, an amount that advertisers have paid over a period of time for use of the respective keyword by the advertisement server to bring up their respective advertisement when a direct search is made using the respective keyword;

selecting respective keywords for the second set of new related search terms based at least in part on how many advertisements are targeted to the respective keyword and based at least in part on how much advertisers have paid over a period of time for use of the respective keyword; and listing, using the one or more computers, on an updated landing page returned for the domain, the first set of initial related search terms with higher revenue generation and the second set of new related search terms.

12. The system as defined in claim 11, wherein the step of obtaining keywords that are semantically relevant to the first set of related search terms comprises, for a respective keyword, determining a term match score for the respective keyword based on a number of matches to the first set of related terms, and a vertical match score comprising for the respective keyword a number of matches to a vertical for the respective related term.

13. The system as defined in claim 11, wherein the step of obtaining for each of multiple of the respective keywords an amount that advertisers have paid over the period of time for use of the respective keyword comprises calculating a total of payments to the advertisement server for use of the respective initial related search term.

14. The system as defined in claim 11, wherein the determining initial related search terms step comprises determining a group of one or more related search terms based at least in part on using a spell check algorithm to determine if the name of the domain or a segment thereof is a correct spelling of a word, and if not, determining a popular search term that is closest to this name of the domain or a segment thereof.

15. The system as defined in claim 14, wherein the determining initial related search terms step comprises obtaining initial keywords that are semantically relevant to one or more of the group of initial related search terms based at least in part on one or more match scores;

obtaining for each of multiple of the initial keywords, using the one or more computers, how many advertisements are targeted to the respective initial keyword;

obtaining for each of multiple of the respective keywords, using the one or more computers, how much advertisers have paid over a period of time for use of the respective initial keyword to bring up their respective advertisement when a direct search is made using the respective initial keyword;

selecting respective initial keywords for the initial related search terms based at least in part on how many advertisements are targeted to the respective initial keyword and based at least in part on how much advertisers have paid over a period of time for use of the respective initial keyword.

16. The system as defined in claim 11, wherein the first set of the initial related search terms is a number selected from the group of 3, 4, and 5.

17. The system as defined in claim 11, further comprising including additional terms in the second set of new related search terms based on input from an advertiser.

18. The system as defined in claim 11, further comprising including additional terms in the second set of new related search terms based on commercial searches on a search engine using terms that are related to the initial related search terms.

19. The system as defined in claim 11, comprising performing substantially periodically or continuously the method steps of claim 11, with the initial related search terms comprising the first set of initial related search terms with higher revenue generation and the second set of new related search terms from an immediately preceding iteration of the method.

20. The system as defined in claim 11, wherein the one or more match scores comprise one or more selected from the group of a term match score and a vertical match score.

* * * * *